(12) United States Patent
Otomitsu (10) Patent No.: US 11,372,170 B2
(45) Date of Patent: Jun. 28, 2022

(54) OPTICAL CONNECTOR SYSTEM AND SHUTTER-EQUIPPED OPTICAL CONNECTOR

(71) Applicant: Fujikura Ltd., Tokyo (JP)

(72) Inventor: Takahito Otomitsu, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 17/259,765

(22) PCT Filed: May 17, 2019

(86) PCT No.: PCT/JP2019/019614
§ 371 (c)(1),
(2) Date: Jan. 12, 2021

(87) PCT Pub. No.: WO2020/059205
PCT Pub. Date: Mar. 26, 2020

(65) Prior Publication Data
US 2021/0341683 A1 Nov. 4, 2021

(30) Foreign Application Priority Data
Sep. 18, 2018 (JP) .............................. JP2018-173409

(51) Int. Cl.
*G02B 6/38* (2006.01)
*G02B 6/40* (2006.01)

(52) U.S. Cl.
CPC ......... *G02B 6/3849* (2013.01); *G02B 6/3825* (2013.01); *G02B 6/40* (2013.01)

(58) Field of Classification Search
CPC .................................................... G02B 6/3849
See application file for complete search history.

(56) References Cited

U.S. PATENT DOCUMENTS

| 9,645,326 B1 | 5/2017 | Sausse et al. |
| 2014/0148055 A1 | 5/2014 | Lee |

FOREIGN PATENT DOCUMENTS

| CN | 1497285 A | 5/2004 |
| CN | 104067154 A | 9/2014 |
| CN | 108351475 A | 7/2018 |
| CN | 111630422 A | 9/2020 |
| JP | H08-138785 A | 5/1996 |
| JP | H09-214147 A | 8/1997 |
| JP | 2004-240162 A | 8/2004 |
| JP | 2013-007841 A | 1/2013 |
| JP | 2017-26956 A | 2/2017 |
| WO | 2017/081298 A1 | 5/2017 |
| WO | 2017/126188 A1 | 7/2017 |

*Primary Examiner* — Omar R Rojas
(74) *Attorney, Agent, or Firm* — Osha Bergman Watanabe & Burton LLP (57) ABSTRACT

An optical connector system includes: a first optical connector that includes a first shutter; and a second optical connector to be connected to the first optical connector. The first shutter opens by inclining toward the second optical connector when the first shutter comes into contact with the second optical connector.

9 Claims, 9 Drawing Sheets

FIG. 5A (PRESENT EMBODIMENT)

FIG. 5B (REFERENCE EXAMPLE)

OPTICAL CONNECTOR SYSTEM AND SHUTTER-EQUIPPED OPTICAL CONNECTOR

TECHNICAL FIELD

The present invention relates to an optical connector system and a shutter-equipped optical connector.

BACKGROUND

Patent Literature 1 discloses an optical connector in which a shutter is provided in an insertion opening. In the optical connector disclosed in Patent Literature 1, when an optical connector serving as a counterpart is inserted into the insertion opening, the optical connector serving as a counterpart contacts a shutter, and the shutter is pushed open.

PATENT LITERATURE

Patent Literature 1: JP 2017-26956A

The shutter described in Patent Literature 1 is pushed open by the optical connector serving as a counterpart, and thus the shutter is inclined to an inner side. However, dust may adhere to an outer surface of the shutter, and, when the shutter is inclined to the inner side, there is a possibility that dust may enter the optical connector.

SUMMARY

One or more embodiments of the present invention provide a shutter-equipped optical connector capable of suppressing entry of dust.

One or more embodiments of the present invention is an optical connector system comprising: a first optical connector including a first shutter; and a second optical connector to be connected to the first optical connector, wherein the first shutter is inclined toward the second optical connector by coming into contact with the second optical connector so that the first shutter is opened.

Other features of embodiments of the invention are made clear by the following description and the drawings.

According to one or more embodiments of the present invention, entry of dust adhering to an outer surface of a shutter into an optical connector can be suppressed.

DETAILED DESCRIPTION

At least the following matters are made clear from the following description and the drawings.

An optical connector system comprising: a first optical connector including a first shutter; and a second optical connector to be connected to the first optical connector, wherein the first shutter is inclined toward the second optical connector by coming into contact with the second optical connector so that the first shutter is opened is made clear. With such an optical connector system, entry of dust adhering to an outer surface of the first shutter into the first optical connector can be suppressed.

According to one or more embodiments, the first shutter includes a body part, a rotation shaft, and a contact part, the contact part is arranged on an opposite side to the body part with respect to the rotation shaft, and by the contact part being pressed with the second optical connector, the first shutter rotates about the rotation shaft, and the body part is inclined toward the second optical connector so that the body part is opened. In this way, when the first optical connector and the second optical connector are connected to each other, the first shutter can be inclined toward the second optical connector and opened.

According to one or more embodiments, the second optical connector includes a second shutter, and when the second shutter comes into contact with the first optical connector and is pushed open, a first housing of the first optical connector is in a state of being inserted into a second housing of the second optical connector. In this way, entry of dust into the second optical connector can be suppressed.

According to one or more embodiments, the first optical connector includes a protrusion, the second optical connector includes a second shutter, and when the first optical connector and the second optical connector are brought close to each other, the protrusion pushes the second shutter open, and then the first shutter opens. In this way, the first shutter is easy to open.

According to one or more embodiments, the second optical connector includes a second shutter, and when the first optical connector and the second optical connector are brought close to each other, an outer surface of the first shutter and an outer surface of the second shutter are brought into contact with each other. In this way, dust adhering to the outer surface of the first shutter can be sandwiched between the first shutter and the second shutter, and thus contamination of the inside of the second optical connector with dust can be suppressed.

According to one or more embodiments, the first shutter includes a first guide part, the second shutter includes a second guide part, and by the first guide part and the second guide part coming into contact with each other, a relative movement of the first optical connector and the second optical connector in a width direction is regulated. In this way, a misalignment of the first optical connector and the second optical connector in the width direction can be suppressed.

According to one or more embodiments, one of the first guide part and the second guide part is a linear projection, and the other is a linear recess, in a closed state of the first shutter and the second shutter, the projection and the recess are located along a direction perpendicular to a direction of attaching/detaching (i.e., attaching/detaching direction) and the width direction, and in an open state of the first shutter and the second shutter, the projection and the recess are located along the direction of attaching/detaching. In this way, a movement of the first optical connector and the second optical connector in the direction of attaching/detaching can be guided by the first guide part and the second guide part.

According to one or more embodiments, the first optical connector includes a first housing including the first shutter, an outer guide part is formed in an outer surface of the first housing, and a position of the outer guide part in the width direction is common to a position of the first guide part in the width direction. In this way, a movement of the first optical connector and the second optical connector in the direction of attaching/detaching can be guided by the second guide part that guides the first guide part, and the outer guide part.

According to one or more embodiments, the first optical connector includes a first housing, and the first housing includes a step part that houses an end part of the first shutter in the closed state. In this way, entry of dust can be suppressed.

According to one or more embodiments, an inclination surface is formed on an end part on an inner side of the first shutter in the closed state. In this way, the first shutter being caught inside the second optical connector can be suppressed.

According to one or more embodiments, the second optical connector includes a first housing part that houses the first shutter of the first optical connector. In this way, the first shutter of the first optical connector open to the outer side can be housed inside the second optical connector.

One or more embodiments of the present invention is a shutter-equipped optical connector comprising: a ferrule; a housing that houses the ferrule; and a shutter that closes an opening of the housing, wherein the shutter is inclined toward an optical connector that is a counterpart of the shutter-equipped optical connector so that the shutter is opened is made clear. With such a shutter-equipped optical connector system, entry of dust adhering to an outer surface of a shutter into the optical connector can be suppressed.

Figure 1A:
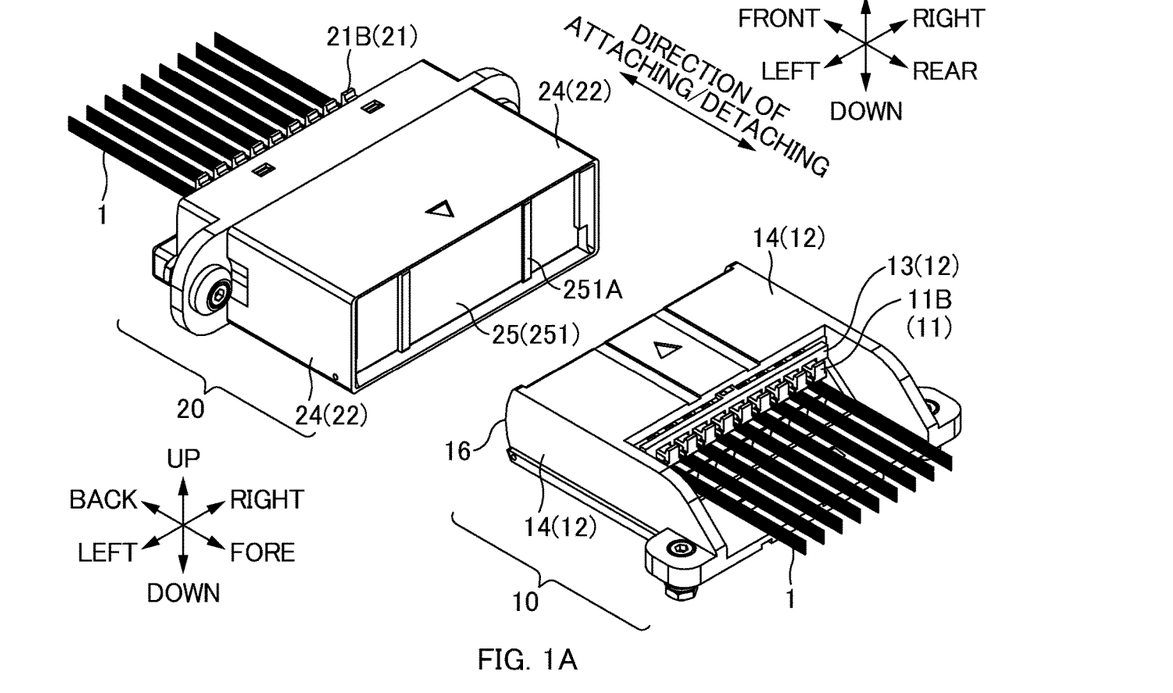
FIGS. 1A and 1B are perspective views of an optical connector system according to one or more embodiments.
Figure 1B:
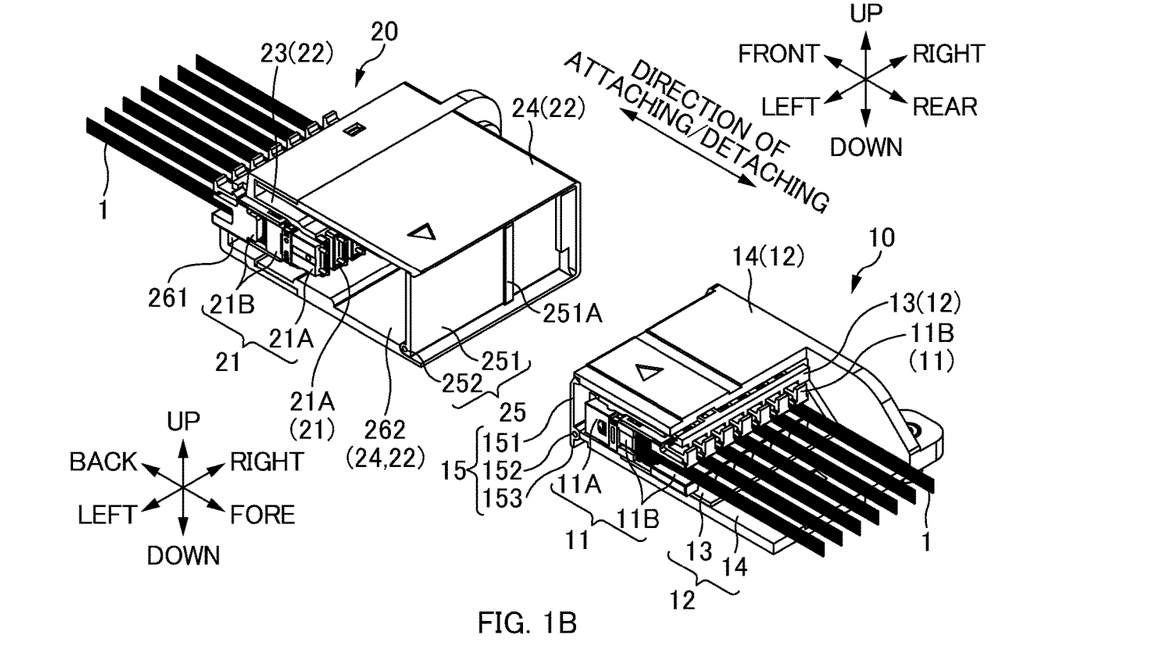
Figure 2A:
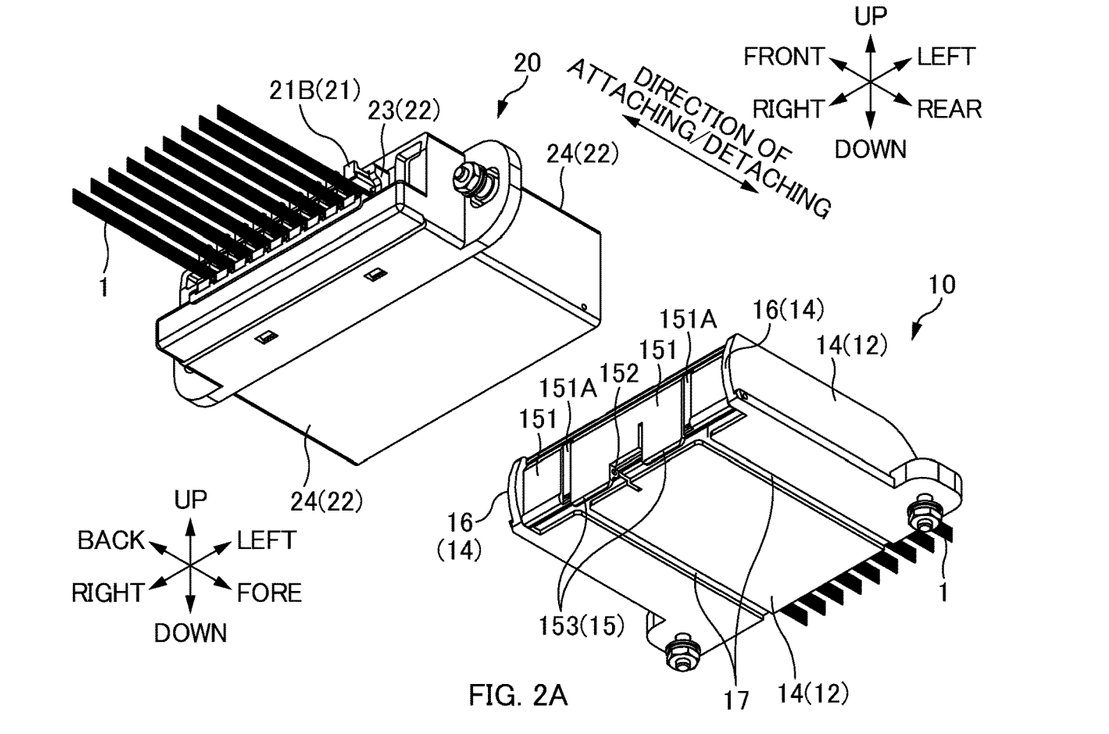
FIGS. 2A and 2B are perspective views of the optical connector system according to one or more embodiments when seen from another angle.
Figure 2B:
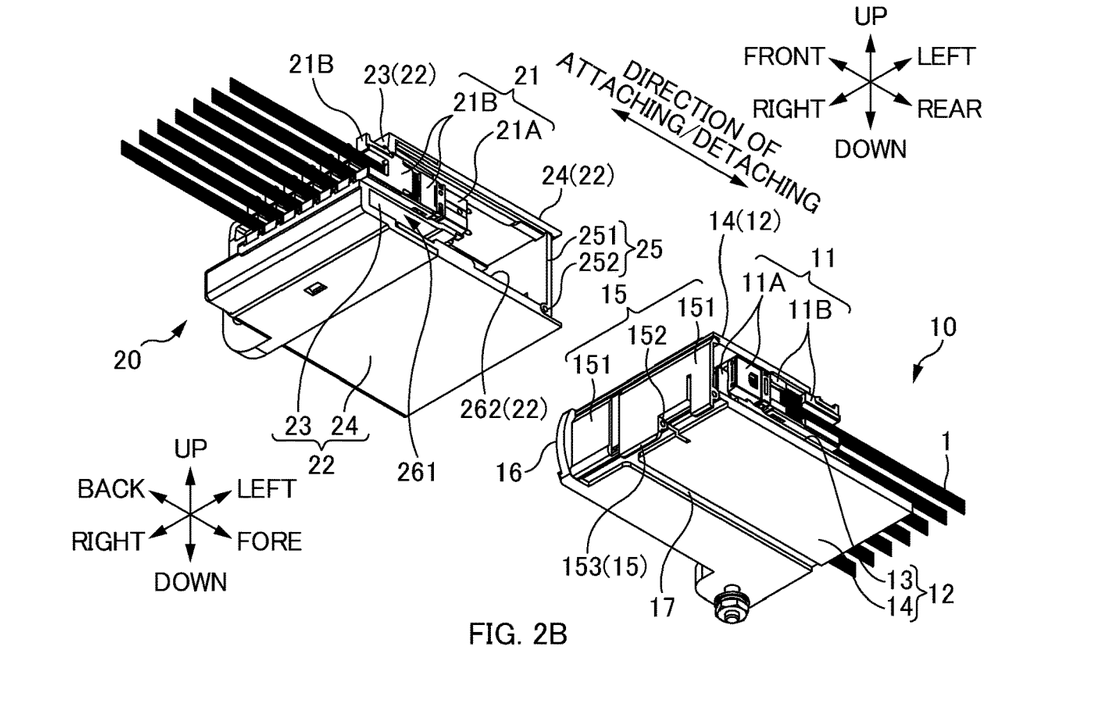
Figure 3A:
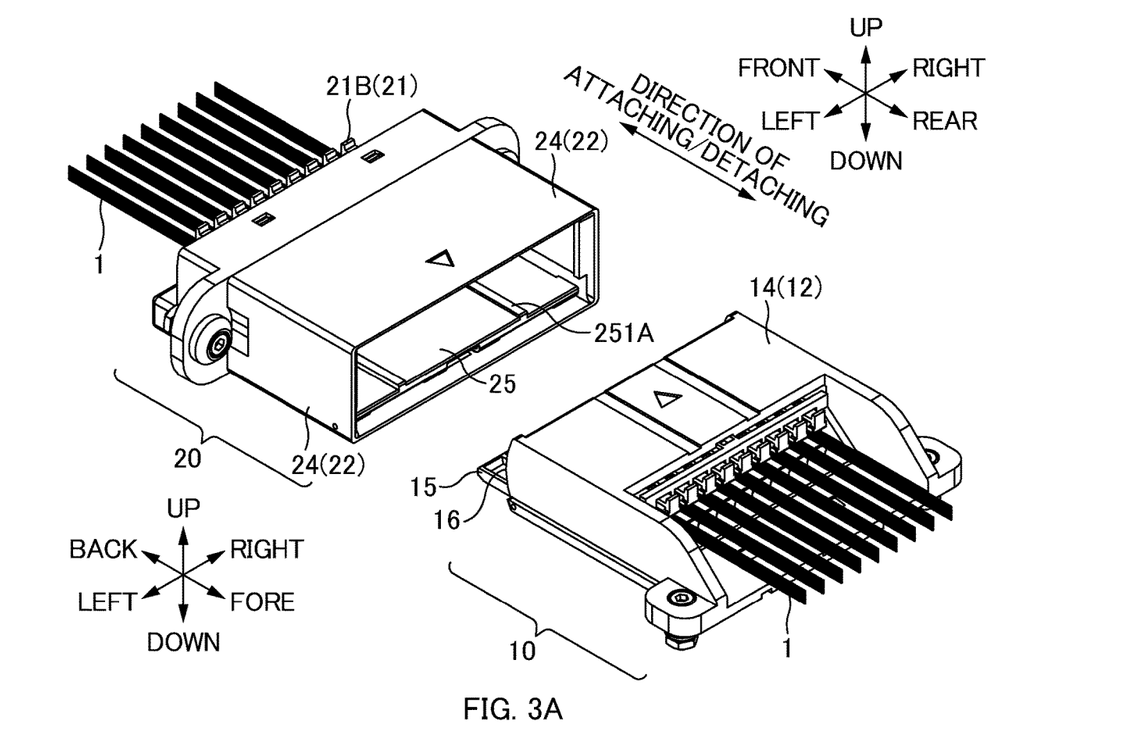
FIGS. 3A and 3B are perspective views of the optical connector system in a state where a shutter is open.
Figure 3B:
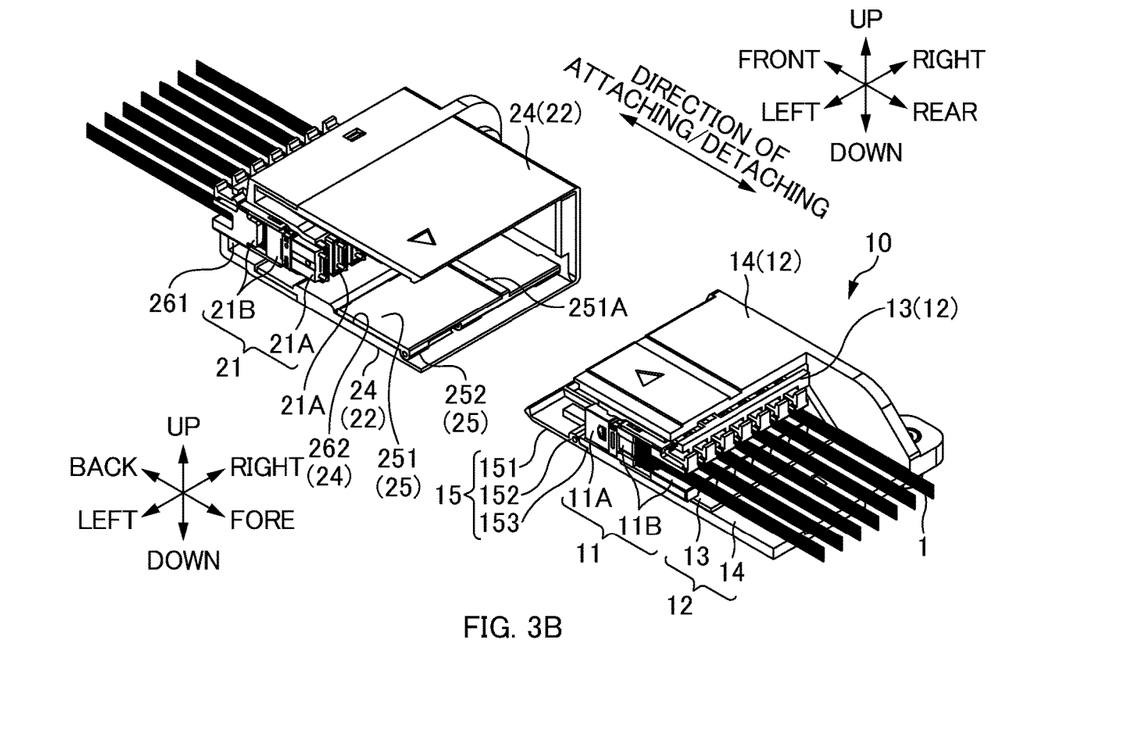
Figure 4A:
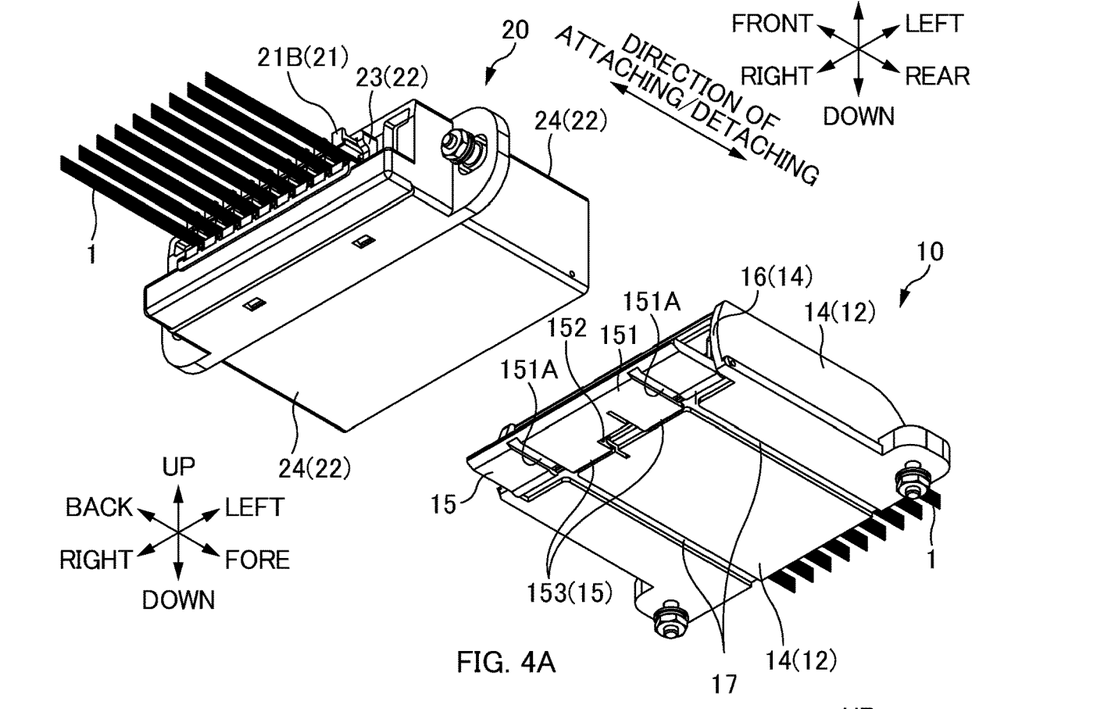
FIGS. 4A and 4B are perspective views of the optical connector system in the state where the shutter is open when seen from another angle.
Figure 4B:
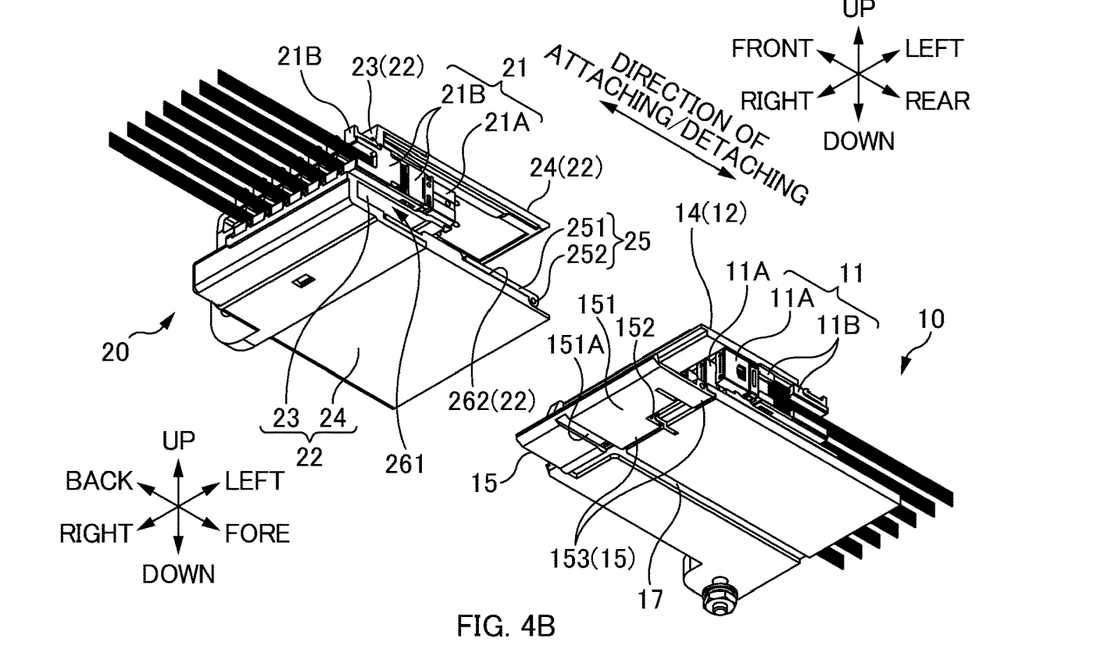

FIGS. 1A and 1B are perspective views of an optical connector system according to one or more embodiments. FIGS. 2A and 2B are perspective views of the optical connector system according to one or more embodiments when seen from another angle. FIGS. 3A and 3B are perspective views of the optical connector system in a state where a shutter is open. FIGS. 4A and 4B are perspective views of the optical connector system in the state where the shutter is open when seen from another angle.

In the following description, directions will be defined as illustrated in FIG. 1A. A direction in which a first optical connector 10 and a second optical connector 20 are connected or removed is a "direction of attaching/detaching". In description of the first optical connector 10, a side of the second optical connector 20 in the direction of attaching/detaching is "front", and an opposite side is "rear". In description of the second optical connector 20, a side of the first optical connector 10 in the direction of attaching/detaching is "fore", and an opposite side is "back". A direction parallel to a rotation shaft (a first rotation shaft 152 and a second rotation shaft 252) of a shutter is a "width direction" or a "left-right direction", and a right side when the front is seen from the rear (or when the back is seen from the fore) is "right", and an opposite side is "left". A direction perpendicular to the direction of attaching/detaching and the width direction is an "up-down direction".

The optical connector system according to one or more embodiments includes the first optical connector 10 and the second optical connector 20. When the first optical connector 10 and the second optical connector 20 are connected to each other, an optical fiber 1 of the first optical connector 10 and an optical fiber 1 of the second optical connector 20 are optically connected to each other. As described later, the first optical connector 10 and the second optical connector 20 are shutter-equipped optical connectors. Note that the first optical connector 10 may be constituted by a shutter-equipped optical connector, and the second optical connector 20 may not be a shutter-equipped optical connector (may not include a second shutter 25).

Herein, the first optical connector 10 is a plug-side connector and a male-type connector. However, the first optical connector 10 may be a receptacle-side connector instead of a plug-side connector. The first optical connector 10 includes a plurality of first optical modules 11 and a first housing 12. In other words, the first optical connector 10 includes a plurality of first ferrules 11A and the first housing 12.

The first optical module 11 is a module attached to a terminal of the optical fiber 1 (herein, an optical fiber ribbon). The first optical module 11 includes the first ferrule 11A and a first holding mechanism 11B. The first ferrule 11A is a member (ferrule) that holds an end part of the optical fiber 1. Herein, the first ferrule 11A is an MT-type optical connector (F12-type optical connector stipulated by JIS C5981). The first holding mechanism 11B is a mechanism for retractably holding the first ferrule 11A to the first housing 12 (specifically, a first inner housing 13) while pressing the first ferrule 11A forward. The first holding mechanism 11B is constituted by, for example, a pin clamp, a spring, a spring push, and the like. Note that the first optical connector 10 may not include the first holding mechanism 11B as long as the first optical connector 10 is configured to include the plurality of first ferrules 11A.

The plurality of first optical modules 11 are aligned along the width direction. Thus, the plurality of first ferrules 11A are also aligned along the width direction.

The first housing 12 is a member that houses the first optical modules 11 (or the first ferrules 11A). Herein, the first housing 12 includes the first inner housing 13 and a first outer housing 14. However, the first housing 12 may be constituted by a single component. The first inner housing 13 is a member that houses the first optical modules 11 (or the first ferrules 11A). The first outer housing 14 is a member that houses the first inner housing 13. The first outer housing 14 is a wide rectangular cylindrical member. The optical fiber 1 extends from a rear side of the first outer housing 14 having a rectangular cylindrical shape, and a front end of the optical fiber 1 is held by the first ferrule 11A.

The first housing 12 (specifically, the first outer housing 14) includes a first shutter 15. The first shutter 15 is a member that closes an opening on a front side of the first outer housing 14 having a rectangular cylindrical shape. Closing the front side of the first housing 12 with the first shutter 15 can suppress adhesion of dust to the first ferrule 11A. As illustrated in FIGS. 3B, 4A, and 4B, the first shutter 15 can be inclined to an outer side (a front side; a side of the second optical connector 20) so that the first shutter 15 is opened. The first shutter 15 is a member having a plate shape, and is perpendicular to the direction of attaching/ detaching in a closed state of the first shutter 15 and is parallel to the up-down direction in an open state of the first shutter 15.

Dust may adhere to an outer surface of the first shutter 15 that closes the opening of the first housing 12. If the first shutter 15 is inclined to an inner side so that the first shutter 15 is opened, there is a possibility that dust adhering to the outer surface may enter the first optical connector 10, and may adhere to the first ferrule 11A (there is a possibility that the first optical connector 10 may be contaminated with dust). In contrast, in one or more embodiments, the first shutter 15 can be inclined to the outer side (the front side; the side of the second optical connector 20) so that the first shutter 15 is opened, and thus entry of dust adhering to the first shutter 15 into the first optical connector 10 can be suppressed. Note that, when the first shutter 15 is inclined to the outer side so that the first shutter 15 is opened, the outer surface of the first shutter 15 in the open state faces an opposite side to a side of a second ferrule 21A of the second optical connector 20 (which will be described later: cf. FIGS. 8A and 8B), and thus the first shutter 15 to which dust adheres is allowed to be inserted into the second optical connector 20. Furthermore, as described later, in one or more embodiments, since dust adhering to the first shutter 15 is in a state of being sandwiched between the first shutter 15 and the second shutter 25 (which will be described later: cf. FIG. 7B), adhesion, to the second ferrule 21A of the second optical connector 20, of dust adhering to the first shutter 15 can be suppressed. Thus, the first shutter 15 is allowed to be inclined toward the second optical connector 20 so that the first shutter 15 is opened.

In one or more embodiments, since the first shutter 15 can be inclined to the outer side (the front side; the side of the second optical connector 20) so that the first shutter 15 is opened, a gap in the front-rear direction between the first shutter 15 and the first ferrules 11A can be reduced (in contrast, the second shutter 25, which will be described later, is inclined to the inner side so that the second shutter 25 is opened, and thus the second shutter 25 and the second ferrules 21A need to be arranged away from each other in the front-rear direction. Thus, by adopting a structure in which the first shutter 15 is inclined to the outer side (the front side; the side of the second optical connector 20) so that the first shutter 15 is opened, a dimension of the first optical connector 10 in the front-rear direction can be reduced.

The first shutter 15 includes a first body part 151, the first rotation shaft 152, and a contact part 153.

The first body part 151 is a plate-shaped section that constitutes a body of the first shutter 15. When the first shutter 15 is closed, the first shutter 15 closes the opening on the front side of the first outer housing 14 having a rectangular cylindrical shape. A first guide part 151A is formed in an outer surface (a surface on the front side; a surface facing the second optical connector 20) of the first body part 151. The first guide part 151A is a section that suppresses a misalignment of the first optical connector 10 in the width direction with respect to the second optical connector 20 (is a section that regulates a relative movement of the first optical connector 10 and the second optical connector 20 in the width direction). The first guide part 151A is a section that guides the first optical connector 10 movably in the direction of attaching/detaching with respect to the second optical connector 20. Herein, the first guide part 151A is formed as a linear recess (groove part). However, the first guide part 151A can also be formed as a linear projection (in this case, a second guide part 251A is formed as a linear recess). The linear first guide part 151A has a shape along the up-down direction (the direction perpendicular to the direction of attaching/detaching and the width direction) in the closed state of the first shutter 15. In the open state of the first shutter 15, the linear first guide part 151A is located along the direction of attaching/detaching.

The first rotation shaft 152 is a section that serves as a rotation shaft of the first shutter 15. The first rotation shaft 152 is formed along the width direction. Here, the first rotation shaft 152 is formed at a front edge on a lower side of the first housing 12. Note that force in a direction to close the first shutter 15 is biased to the first shutter 15 with a first spring (not illustrated) provided to the first rotation shaft 152.

The contact part 153 is a section that contacts the second optical connector 20. The contact part 153 is arranged on an opposite side to the first body part 151 with respect to the first rotation shaft 152. Here, the contact part 153 has a shape protruding downward from the first rotation shaft 152. When the contact part 153 is pressed to the rear side, the first shutter 15 rotates about the first rotation shaft 152, and the first shutter 15 can be inclined to the front side so that the first shutter 15 is opened. As will be described later, when the first optical connector 10 and the second optical connector 20 are connected to each other, the contact part 153 is brought into contact with the second optical connector 20 and pressed to the rear side from the second optical connector 20, and thus the first shutter 15 is inclined to the front side so that the first shutter 15 is opened.

The first housing 12 further includes a protrusion 16. The protrusion 16 is a section that protrudes from left and right edges of the first housing 12 to the front side (the side of the second optical connector 20). The protrusion 16 is arranged to protrude to a front side than the first shutter 15. In this way, when the first optical connector 10 and the second optical connector 20 are connected to each other, the protrusion 16 is brought into contact with the second shutter 25 of the second optical connector 20 earlier than the first shutter 15 being brought into contact with the second shutter 25 (described later).

The first housing 12 further includes a first outer guide part 17. The first outer guide part 17 is a guide part formed in an outer surface (here, a lower surface) of the first housing (here, the first outer housing 14). The first outer guide part 17 is a section that suppresses a misalignment of the first optical connector 10 in the width direction with respect to the second optical connector 20 (is a section that regulates a relative movement of the first optical connector 10 and the second optical connector 20 in the width direction). The first outer guide part 17 is a section that guides the first optical connector 10 movably in the direction of attaching/detaching with respect to the second optical connector 20. Here, the first outer guide part 17 is formed as a linear recess. However, the first outer guide part 17 can also be formed as a linear projection. The linear first guide part 151A has a shape along the direction of attaching/detaching.

A position of the first outer guide part 17 in the width direction is common to a position of the first guide part 151A of the first shutter 15 in the width direction. In this way, the first optical connector 10 can be guided by the same guide part (the second guide part 251A).

Figure 5A:
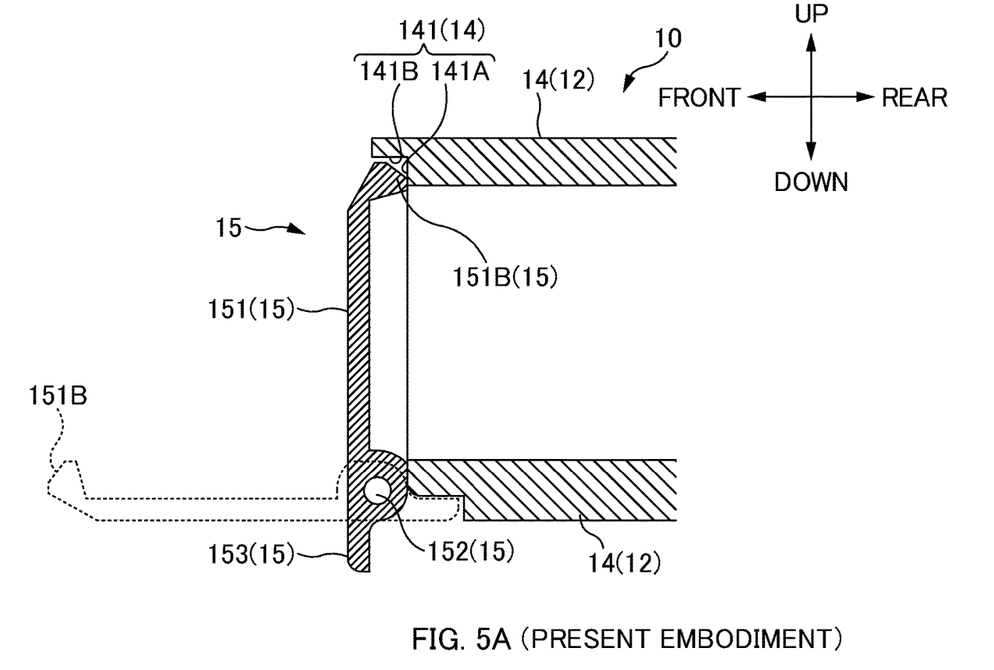
FIG. 5A is a cross-sectional view near a first shutter 15 and a first housing 12 according to one or more embodiments.

FIG. 5A is a cross-sectional view near the first shutter 15 and the first housing 12 according to one or more embodiments.

A step part 141 is formed at a front edge on an upper side of the first housing 12. The step part 141 is a step-shaped section for housing an end part of the first shutter 15 in the closed state. The step part 141 includes a stopper surface 141A and an upper counter surface 141B. The stopper surface 141A is a surface that contacts the first shutter 15 and serves as a stopper of the first shutter 15 biased in the closed direction. The stopper surface 141A is constituted by a surface perpendicular to the direction of attaching/detaching. The upper counter surface 141B is a surface that faces the end part (upper edge) of the first shutter 15. The upper counter surface 141B is a surface perpendicular to the up-down direction and is a surface facing downward. In one or more embodiments, a part of the front edge on the upper side of the first housing 12 protrudes to the front side than the stopper surface 141A, and the upper counter surface 141B is constituted by a lower surface of the section protruding to the front side than the stopper surface 141A.

Figure 5B:
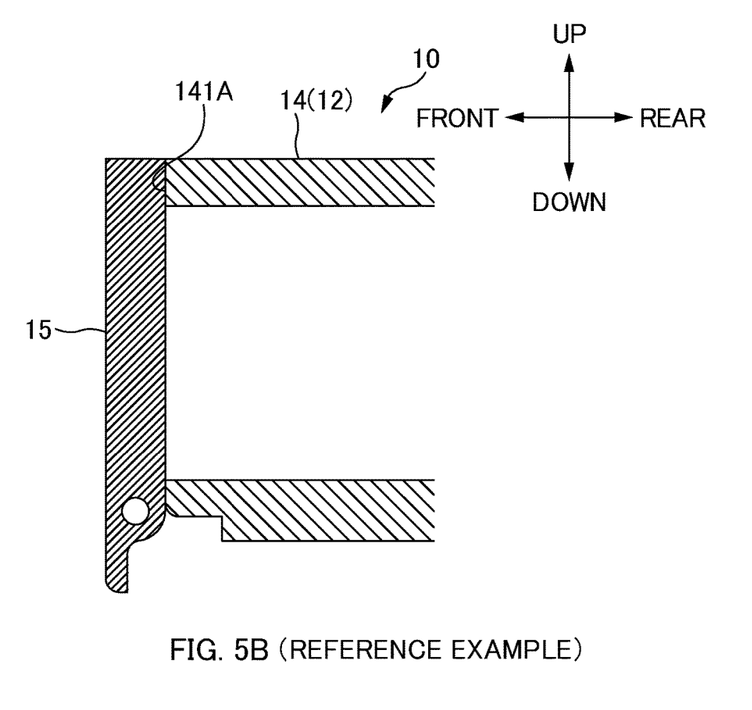
FIG. 5B is a cross-sectional view near the first shutter 15 and the first housing 12 according to a reference example.

FIG. 5B is a cross-sectional view near the first shutter 15 and the first housing 12 according to a reference example. In the reference example, the step part 141 is not formed at the front edge on the upper side of the first housing 12. In other words, in the reference example, the upper counter surface 141B is not formed. According to such configuration of the reference example, when a gap is formed between the first shutter 15 and the stopper surface 141A, dust is more likely to enter inside the first optical connector 10 through the gap.

In contrast, in one or more embodiments illustrated in FIG. 5A, the upper counter surface 141B is arranged so as to cover a gap between the first shutter 15 and the stopper surface 141A from above. Thus, even in a case where a gap is formed between the first shutter 15 and the stopper surface 141A, entry of dust through the gap between the first shutter 15 and the stopper surface 141A can be suppressed. In one or more embodiments, by forming the step part 141, the gap (entry path of dust) between the first shutter 15 and the first housing 12 (the step part 141) can be increased in length, and the entry path of dust can also be bent. Thus, entry of dust through the gap can be suppressed.

In one or more embodiments, as illustrated in FIG. 5A, a first inclination surface 151B is formed on the end part (upper edge) of the first shutter 15. The first inclination surface 151B is arranged on an end part (upper rear edge) on the inner side of the first shutter 15 in the closed state of the first shutter 15. In other words, the first inclination surface 151B is a surface facing a rear upper side in the closed state of the first shutter 15. Thus, the first inclination surface 151B is in a state of facing a front upper side in the open state of the first shutter 15 (cf. a dotted line in FIG. 5A). In this way, when the first optical connector 10 and the second optical connector 20 are connected to each other, the first shutter 15 being caught inside the second optical connector 20 can be suppressed (described later: cf. FIG. 8B).

Here, the second optical connector 20 is a receptacle-side connector and a female-type connector. However, the second optical connector 20 may be a plug-side connector instead of a receptacle-side connector. The second optical connector 20 includes a plurality of second optical modules 21 and a second housing 22. In other words, the second optical connector 20 includes the plurality of second ferrules 21A and the second housing 22.

Each of the second optical modules 21 is a module attached to a terminal of the optical fiber 1 (herein, an optical fiber ribbon). The second optical modules 21 include the plurality of second ferrules 21A and second holding mechanisms 21B. The structure of the second optical module 21 is substantially the same as the structure of the first optical module 11. Note that the second optical connector 20 may not include the second holding mechanism 21B as long as the second optical connector 20 is configured to include the plurality of second ferrules 21A. The plurality of second optical modules 21 are aligned along the width direction. Thus, the second ferrules 21A are also aligned along the width direction. Each of the second ferrules 21A is connected to each of the first ferrules 11A of the first optical connector 10.

The second housing 22 is a member that houses the second optical modules 21 (or the second ferrules 21A). Here, the second housing 22 includes a second inner housing 23 and a second outer housing 24. The second housing 22 may be constituted by a single component. The second inner housing 23 is a member that houses the second optical modules 21. The second outer housing 24 is a member that houses the second inner housing 23. The second outer housing 24 is a wide rectangular cylindrical member. The optical fiber 1 extends from a back side of the second outer housing 24 having a rectangular cylindrical shape, and an end part on a fore side of the optical fiber 1 is held by the second ferrule 21A.

In one or more embodiments, the first housing 12 (the first outer housing 14) of the first optical connector 10 is inserted into the second housing 22 (the second outer housing 24) having a rectangular cylindrical shape. Thus, in one or more embodiments, the second optical connector 20 is a female-type connector, and the first optical connector 10 is a male-type connector.

The second housing 22 (specifically, the second outer housing 24) includes the second shutter 25. The second shutter 25 is a member that closes an opening on a front side of the second outer housing 24 having a rectangular cylindrical shape. The second shutter 25 closes the front side of the second housing 22, and thus adhesion of dust to the second ferrule 21A can be suppressed. The second shutter 25 is arranged on the back side with respect to a fore-side edge of the opening of the second housing 22 having a rectangular cylindrical shape. Thus, the edge of the opening of the second housing 22 having a rectangular cylindrical shape protrudes to the fore side than the second shutter 25. As illustrated in FIG. 3A, the second shutter 25 can be inclined to an inner side (the back side) so that the second shutter 25 is opened. The second shutter 25 is a member having a plate shape, and is perpendicular to the direction of attaching/detaching in a closed state of the second shutter 25 and is parallel to the direction of attaching/detaching in an open state of the second shutter 25.

The second shutter 25 includes a second body part 251 and the second rotation shaft 252. The second body part 251 is a plate-shaped section that constitutes a body of the second shutter 25, and is a section that closes the opening on the front side of the second outer housing 24 having a rectangular cylindrical shape. The second rotation shaft 252 is a section that serves as a rotation shaft of the second shutter 25. The second rotation shaft 252 is formed along the width direction. Here, the second rotation shaft 252 is formed in a lower surface of an inner wall of the second housing 22. Note that force in a direction to close the second shutter 25 is biased to the second shutter 25 by a second spring (not illustrated) provided to the second rotation shaft 252.

In one or more embodiments, the second rotation shaft 252 is arranged on the lower side than the first rotation shaft 152 (cf. FIG. 6B described later). The second rotation shaft 252 is arranged on the back side with respect to the fore-side edge (edge of the opening) of the second outer housing 24. Thus, when the second shutter 25 is brought into contact with the first optical connector 10 and opens, the first housing 12 is in a state of fitting inside the second housing 22 (described later).

The second guide part 251A is formed on an outer surface (a surface on the fore side; a surface facing the first optical connector 10) of the second shutter 25. The second guide part 251A is a section that suppresses a misalignment of the second optical connector 20 in the width direction with respect to the first optical connector 10. In other words, the second guide part 251A is a section that regulates a relative movement of the first optical connector 10 and the second optical connector 20 in the width direction together with the first guide part 151A. The second guide part 251A is a section that guides the second optical connector 20 movably in the direction of attaching/detaching with respect to the first optical connector 10. In other words, the second guide part 251A is a section that guides, together with the first guide part 151A, a movement of the first optical connector 10 and the second optical connector 20 in the direction of attaching/detaching. Here, the second guide part 251A is formed as a linear projection (projecting stripe). However, the second guide part 251A can also be formed as a linear recess (in this case, the first guide part 151A is formed as a linear projection). The linear second guide part 251A has a shape along the up-down direction (the direction perpendicular to the direction of attaching/detaching and the width direction) in the closed state of the second shutter 25. In the open state of the second shutter 25, the linear second guide part 251A is located along the direction of attaching/detaching.

The second housing 22 (the second outer housing 24) includes a second housing part 262. The second housing part 262 is a housing part (housing space) for housing the second shutter 25. The second housing part 262 is arranged inside the second outer housing 24 having a rectangular cylindrical shape, and is formed to the back side of the second rotation shaft 252. When the second shutter 25 opens (is inclined to the inner side), the second shutter 25 is housed in the second housing part 262.

The second housing 22 (the second outer housing 24) includes a first housing part 261. The first housing part 261 is a housing part (housing space) for housing the first shutter of the first optical connector 10. In one or more embodiments, since the first shutter 15 of the first optical connector 10 is inclined to the outer side, the first housing part 261 that houses the first shutter 15 of the first optical connector 10 is formed in the second optical connector 20. The first housing part 261 is formed between the second inner housing 23 of the second optical connector 20 and an inner surface of the second outer housing 24. The first housing part 261 is arranged to the back side than the second ferrule 21A. When the first optical connector 10 and the second optical connector 20 are connected to each other, the first shutter 15 in the open state is housed in the first housing part 261 of the second optical connector 20 (described later).

<Operation Description>

Figure 6A:
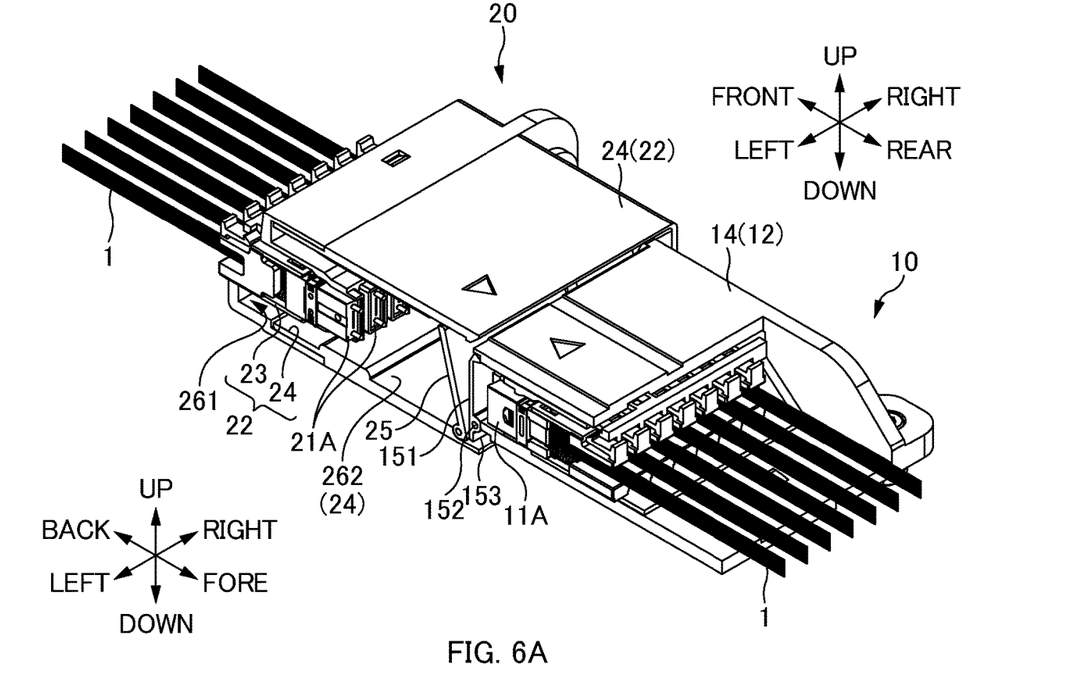
FIGS. 6A and 6B are explanatory diagrams of a state where a second shutter 25 starts to open.
Figure 6B:
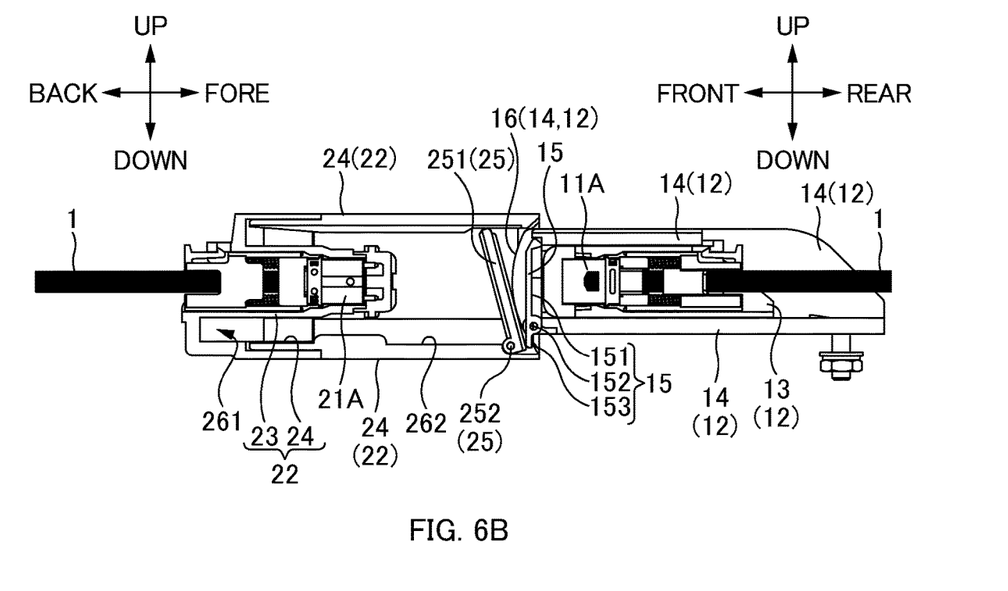

FIGS. 6A and 6B are explanatory diagrams of a state where the second shutter 25 starts to open.

When the first optical connector 10 and the second optical connector 20 are brought closer to each other to be connected to each other, the first optical connector 10 (specifically, the protrusion 16) is brought into contact with the second shutter 25 of the second optical connector 20, and the second shutter 25 is pushed open.

In one or more embodiments, the second shutter 25 is arranged to the back side with respect to the fore-side edge of the opening of the second housing 22 having a rectangular cylindrical shape. Thus, when the first optical connector 10 contacts the second shutter 25, the first housing 12 (the first outer housing 14) of the first optical connector 10 is in a state of being inserted into the second housing 22 having a rectangular cylindrical shape. In other words, when the second shutter 25 opens, the first housing 12 is in a state of fitting inside the second housing 22. Thus, when the second shutter 25 opens, the opening of the second housing 22 is in a state of being closed by the first housing 12 of the first optical connector 10, and thus entry of dust into the second optical connector 20 can be suppressed.

In one or more embodiments, the protrusion 16 protruding to the front side is formed on the first housing 12 of the first optical connector 10. The protrusion 16 is arranged so as to protrude on the front side than the first shutter 15. In this way, when the first optical connector 10 and the second optical connector 20 are connected to each other, the protrusion 16 is brought into contact with the second shutter 25 of the second optical connector 20 earlier than the first shutter 15 being brought into contact with the second shutter 25, and the second shutter 25 is pushed open. In other words, in one or more embodiments, after the second shutter 25 starts to open, the first shutter 15 opens (i.e., the second shutter 25 starts to open first before the first shutter 15 opens). If the second shutter 25 contacts the first shutter 15 before the second shutter 25 opens, the first body part 151 of the first shutter 15 is in a contact state with the second shutter 25, and thus it is hard for the first shutter 15 to incline to the front side (hard to open). In contrast, in one or more embodiments, when the contact part 153 of the first shutter 15 contacts the second shutter 25, the second shutter 25 has already started to open. Thus, the first body part 151 of the first shutter 15 is not in contact with the second shutter 25, and thus it is easy for the first shutter 15 to incline to the front side (easy to open).

Figure 7A:
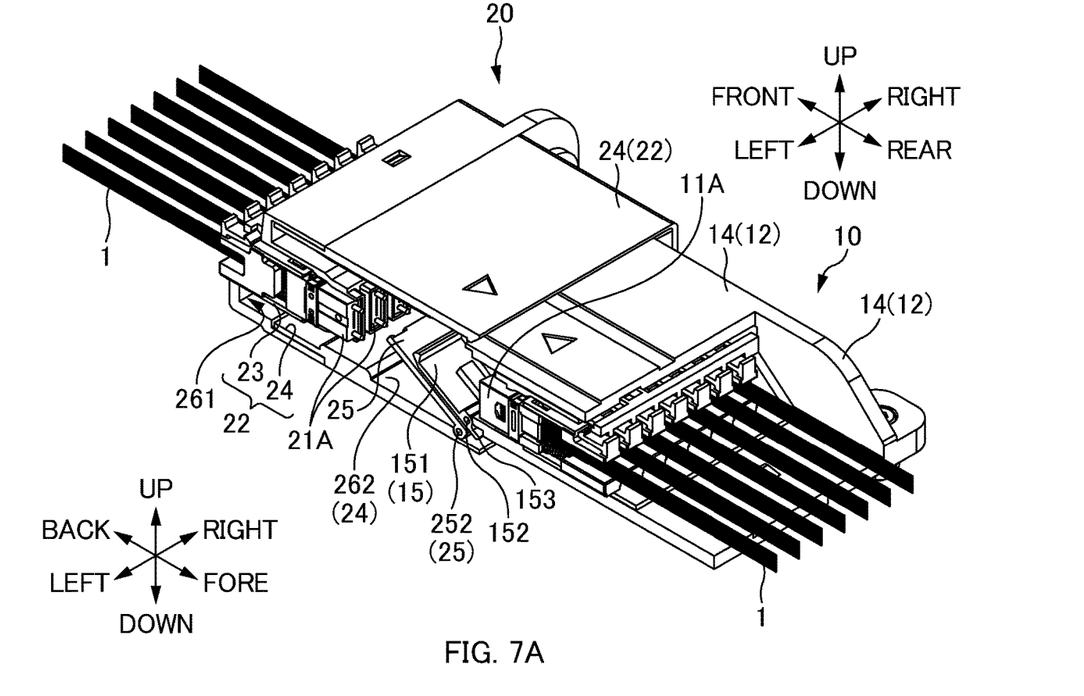
FIGS. 7A and 7B are explanatory diagrams of a state where the first shutter 15 starts to open.
Figure 7B:
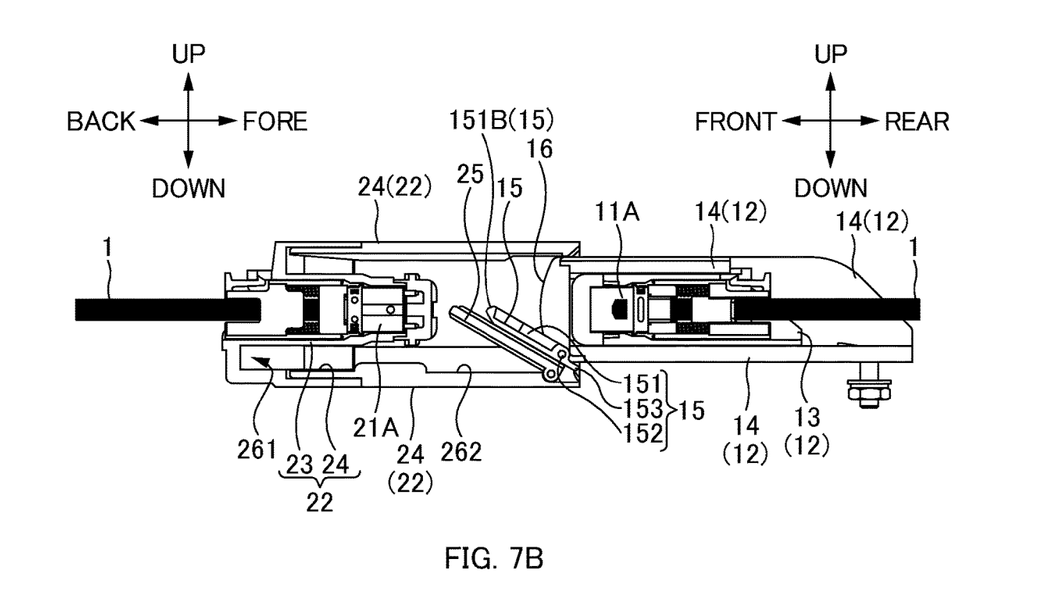

FIGS. 7A and 7B are explanatory diagrams of a state where the first shutter 15 starts to open.

After the second shutter 25 starts to open (cf. FIGS. 6A and 6B), the first optical connector 10 and the second optical connector 20 are further brought closer to each other to be connected to each other. Then, as illustrated in FIGS. 7A and 7B, the second optical connector 20 (specifically, a lower part of the second shutter 25) contacts the contact part 153 of the first shutter 15, the contact part 153 is pressed to the rear side, the first shutter 15 rotates about the first rotation shaft 152, and the first shutter 15 is inclined to the front side so that the first shutter 15 is opened.

In one or more embodiments, the second rotation shaft 252 is arranged on the lower side than the first rotation shaft 152. In this way, when the first shutter 15 is inclined to the front side and brought into contact with the second shutter 25, and the first shutter 15 is further inclined to the front side, the second shutter 25 can be inclined to the back side together with the first shutter 15.

In one or more embodiments, as illustrated in FIG. 7B, the first shutter 15 is inclined while contacting the second shutter 25. Thus, even in a case where dust adheres to the first shutter 15, dust is in a state of being sandwiched between the first shutter 15 and the second shutter 25, and thus adhesion, to the second ferrule 21A of the second optical connector 20, of dust adhering to the first shutter 15 can be suppressed. Thus, in one or more embodiments, the first shutter 15 is allowed to be inclined toward the second optical connector 20 so that the first shutter 15 is opened. In one or more embodiments, even in a case where dust adheres to the second shutter 25, dust is in a state of being sandwiched between the first shutter 15 and the second shutter 25, and thus adhesion of dust adhering to the second shutter 25 to the second ferrule 21A of the second optical connector 20, when the second shutter 25 is inclined to the back side and opens can be suppressed.

In one or more embodiments, the first guide part 151A is formed in the outer surface of the first shutter 15 (the surface of the first body part 151 on the front side; the surface facing the second optical connector 20), and the second guide part 251A is formed on the outer surface of the second shutter 25 (the surface of the second body part 251 on the fore side; the surface facing the first optical connector 10). The first guide part 151A and the second guide part 251A are formed as a linear recess and a linear projection that are perpendicular to the width direction. Thus, as illustrated in FIGS. 7A and 7B, when the first guide part 151A and the second guide part 251A are brought into contact with each other, the recess and the projection fit together, and a relative movement of the first optical connector 10 and the second optical connector 20 in the width direction is regulated. In this way, in one or more embodiments, the first guide part 151A and the second guide part 251A can suppress a misalignment of the first optical connector 10 and the second optical connector 20 in the width direction.

Figure 8A:
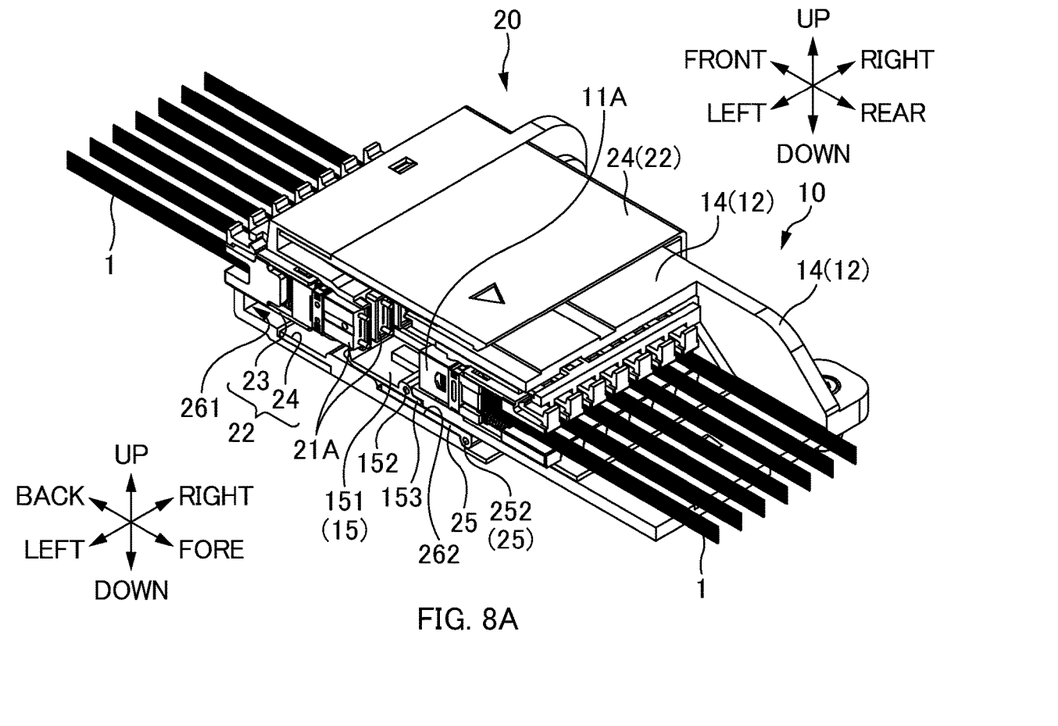
FIGS. 8A and 8B are explanatory diagrams of a state where the second shutter 25 opens, and a first optical connector 10 and a second optical connector 20 are then further brought closer to each other.
Figure 8B:
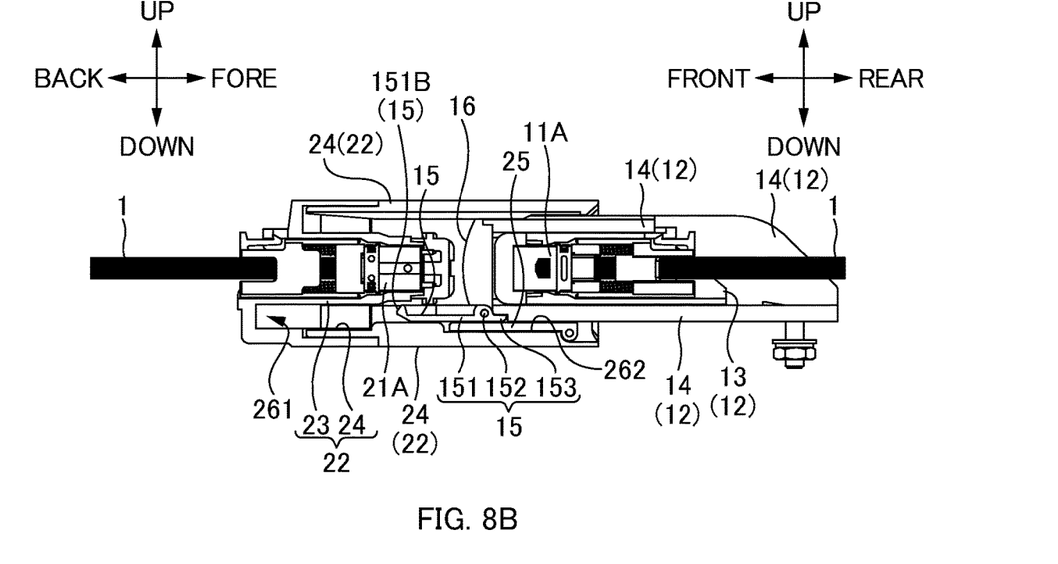

FIGS. 8A and 8B are explanatory diagrams of a state where the second shutter 25 opens, and the first optical connector 10 and the second optical connector 20 are then further brought closer to each other.

When the first optical connector 10 and the second optical connector 20 are further brought closer to each other from the state illustrated in FIGS. 7A and 7B described above, as illustrated in FIGS. 8A and 8B, the first optical connector 10 pushes the second shutter 25 down, and the second shutter 25 is housed in the second housing part 262 of the second housing 22. When the first optical connector 10 and the second optical connector 20 are further brought closer to each other from a state (state where the second shutter 25 opens) where the second shutter 25 is housed in the second housing part 262, the first optical connector 10 moves inside the second housing 22 so as to slide on the upper surface (upper surface being inclined) of the second shutter 25. Since the second shutter 25 is in a state of being sandwiched between the second housing 22 (the second outer housing 24) and the second optical connector 20 (the first shutter 15 and the first outer housing 14), the second shutter 25 is held in a state of being housed in the second housing part 262. Since the contact part 153 continues to contact the second optical connector 20 (the upper surface of the second shutter 25 and the inner surface of the second housing 22), the first shutter 15 is in a state where rotation in the closed direction is regulated, and thus the first shutter 15 is held in the open state.

In one or more embodiments, the first guide part 151A and the second guide part 251A are formed as a linear recess and a linear projection. The first guide part 151A and the second guide part 251A are located along the up-down direction (the direction perpendicular to the direction of attaching/detaching and the width direction) in the closed state of the first shutter 15 and the second shutter 25, but are located along the direction of attaching/detaching in the open state of the first shutter 15 and the second shutter 25. Thus, as illustrated in FIGS. 8A and 8B, in the open state of the first shutter 15 and the second shutter 25, the linear first guide part 151A and the linear second guide part 251A can guide a movement of the first optical connector 10 and the second optical connector 20 in the direction of attaching/detaching while suppressing a misalignment of the first optical connector 10 and the second optical connector 20 in the width direction.

In addition, in one or more embodiments, the first outer guide part 17 is formed on the lower surface (the surface that faces the second shutter 25 housed in the second housing part 262) of the first housing 12. The first outer guide part 17 is formed as a linear recess similarly to the first guide part 151A, and a position of the first outer guide part 17 in the width direction is common to a position of the first guide part 151A in the width direction (cf. FIG. 4A). In this way, a movement of the first optical connector 10 and the second optical connector 20 in the direction of attaching/detaching can be guided by using the second guide part 251A that fits with the first guide part 151A, and the first outer guide part 17.

An internal dimension (a dimension between the upper inner surface and the lower inner surface of the second outer housing 24) of the second housing 22 is slightly greater than an external dimension of the first housing 12. In this way, since there is play, the first shutter 15 may not be in a completely open state (a state of being parallel to the direction of attaching/detaching), and the first shutter 15 having a plate shape may be slightly inclined with respect to the direction of attaching/detaching. Then, it is conceivable that the end part (upper edge) of the first shutter 15 being inclined in such a manner is caught by the second optical module 21 and the second inner housing 23.

In contrast, in one or more embodiments, the first inclination surface 151B is formed on the first body part 151 of the first shutter 15. The first inclination surface 151B is arranged on the end part (upper rear edge) on the inner side of the first shutter 15 in the closed state of the first shutter 15, and thus the first inclination surface 151B is arranged so as to face an upper front side in the open state of the first shutter 15 (cf. the dotted line in FIG. 5A). In this way, even in a case where the end part (the first inclination surface 151B) of the first shutter 15 being inclined contacts the second optical module 21 and the second inner housing 23, the first inclination surface 151B can guide the first shutter 15 to the lower side of the second optical module 21 and the second inner housing 23. Thus, the end part of the first shutter 15 being caught by the second optical module 21 and the second inner housing 23 can be suppressed.

Figure 9A:
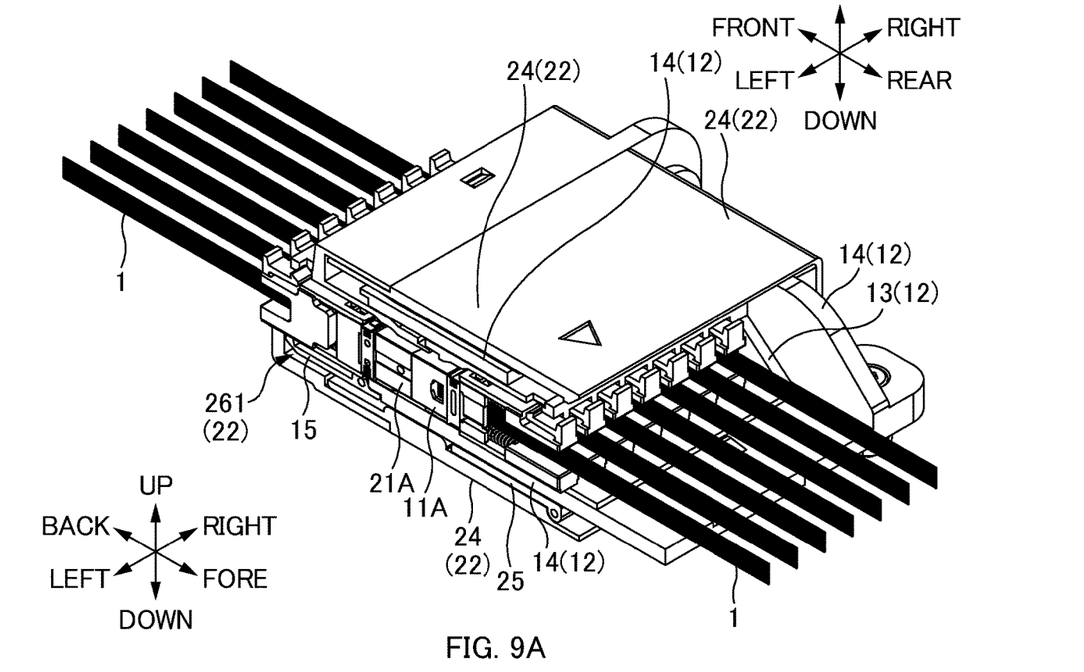
FIGS. 9A and 9B are explanatory diagrams of a state where the first optical connector 10 and the second optical connector 20 are connected to each other.
Figure 9B:
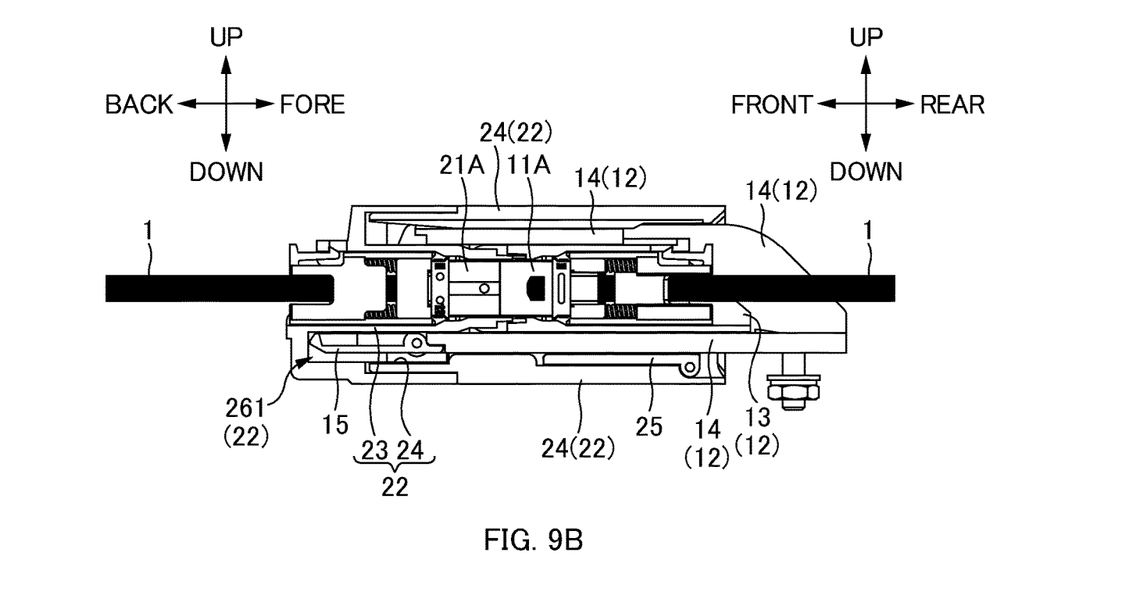

FIGS. 9A and 9B are explanatory diagrams of a state where the first optical connector 10 and the second optical connector 20 are connected to each other.

After the first shutter 15 and the second shutter 25 open, the first optical connector 10 and the second optical connector 20 are further brought closer to each other, and, as illustrated in FIGS. 9A and 9B, the first optical connector 10 and the second optical connector 20 are connected to each other in a state where the first ferrule 11A and the second ferrule 21A abut each other. At this time, a first coupling mechanism (not illustrated) of the first housing 12 and a second coupling mechanism (not illustrated) of the second housing 22 are coupled to each other. In this way, the first ferrule 11A and the second ferrule 21A are held in a state of abutting each other while each being pressed by a spring.

When the first optical connector 10 and the second optical connector 20 are connected to each other, as illustrated in FIGS. 9A and 9B, the first shutter 15 of the first optical connector 10 is housed in the first housing part 261 of the second optical connector 20. In one or more embodiments, since the first shutter 15 is inclined to the outer side (the front side; the side of the second optical connector 20) so that the first shutter 15 is opened, the first housing part 261 that houses the first shutter 15 of the first optical connector 10 is arranged in the second optical connector 20 instead of being arranged in the first optical connector 10. Note that, since the second shutter 25 is inclined to the inner side (back side) so that the second shutter 25 is opened, the second housing part 262 that houses the second shutter 25 is arranged in the second optical connector 20 (specifically, the second outer housing 24) including the second shutter 25.

OTHER

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical fiber;
10: First optical connector;
11: First optical module;
11A: First ferrule;
11B: First holding mechanism;
12: First housing;
13: First inner housing;
14: First outer housing;
141: Step part;
141A: Stopper surface;
141B: Upper counter surface;
15: First shutter;
151: First body part;
151A: First guide part;
151B: First inclination surface;
152: First rotation shaft;
153: Contact part;
16: Protrusion;
17: First outer guide part;
20: Second optical connector;
21: Second optical module;
21A: Second ferrule;
21B: Second holding mechanism;
22: Second housing;
23: Second inner housing;
24: Second outer housing;
25: Second shutter;
251: Second body part;
251A: Second guide part;
252: Second rotation shaft;
261: First housing part;
262: Second housing part.

The invention claimed is:

1. An optical connector system comprising:
a first optical connector including a first shutter; and
a second optical connector to be connected to the first optical connector, wherein
the first shutter opens by inclining toward the second optical connector when the first shutter comes into contact with the second optical connector,
the second optical connector includes a second shutter,
when the first optical connector and the second optical connector are brought close to each other, an outer surface of the first shutter and an outer surface of the second shutter are brought into contact with each other,
the first shutter includes a first guide part,
the second shutter includes a second guide part,
when the first guide part and the second guide part are brought into contact with each other, a relative movement of the first optical connector and the second optical connector is regulated in a width direction of the optical connector system,
one of the first guide part and the second guide part is a linear projection, and the other is a linear recess,
in a closed state of the first shutter and the second shutter, the projection and the recess are located along a direction perpendicular to an attaching/detaching direction and the width direction, and
in an open state of the first shutter and the second shutter, the projection and the recess are located along the attaching/detaching direction.

2. The optical connector system according to claim 1, wherein
the first shutter includes a body part, a rotation shaft, and a contact part,
the contact part is arranged on an opposite side to the body part with respect to the rotation shaft, and
when the contact part is pressed against the second optical connector, the first shutter rotates about the rotation shaft, and the body part is inclined toward the second optical connector so that the body part is opened.

3. The optical connector system according to claim 2, wherein
the second optical connector includes a second shutter, and
when the second shutter comes into contact with the first optical connector and is pushed open, a first housing of the first optical connector is in a state of being inserted into a second housing of the second optical connector.

4. The optical connector system according to claim 2, wherein
the first optical connector includes a protrusion,
the second optical connector includes a second shutter, and
when the first optical connector and the second optical connector are brought close to each other, the protrusion pushes the second shutter open, and then the first shutter opens.

5. The optical connector system according to claim 1, wherein
the first optical connector includes a first housing including the first shutter,
an outer guide part is formed in an outer surface of the first housing, and
a position of the outer guide part in the width direction is common to a position of the first guide part in the width direction.

6. The optical connector system according to claim 1, wherein
the first optical connector includes a first housing, and
the first housing includes a step part that houses an end part of the first shutter in the closed state.

7. The optical connector system according to claim 1, wherein
an inclination surface is formed on an end part on an inner side of the first shutter in the closed state.

8. The optical connector system according to claim 1, wherein
the second optical connector includes a first housing part that houses the first shutter of the first optical connector.

9. A shutter-equipped optical connector comprising:
a ferrule;
a housing that houses the ferrule; and
a first shutter that closes an opening of the housing, wherein the first shutter opens by inclining toward a counterpart optical connector that is a counterpart of the shutter-equipped optical connector when the first shutter comes into contact with the counterpart optical connector, the counterpart optical connector includes a second shutter, when the shutter-equipped optical connector and the counterpart optical connector are brought close to each other, an outer surface of the first shutter and an outer surface of the second shutter are brought into contact with each other, the first shutter includes a first guide part, the second shutter includes a second guide part, when the first guide part and the second guide part are brought into contact with each other, a relative movement of the shutter-equipped optical connector and the counterpart optical connector is regulated in a width direction of the shutter-equipped optical connector, one of the first guide part and the second guide part is a linear projection, and the other is a linear recess, in a closed state of the first shutter and the second shutter, the projection and the recess are located along a direction perpendicular to an attaching/detaching direction and the width direction, and in an open state of the first shutter and the second shutter, the projection and the recess are located along the attaching/detaching direction.

* * * * *